(12) United States Patent
Zheng et al.

(10) Patent No.: US 8,430,039 B2
(45) Date of Patent: Apr. 30, 2013

(54) MAGNETIC LEVITATION VEHICLE AND METHOD FOR LIFTING AND/OR LOWERING THE VEHICLE

(75) Inventors: Qinghua Zheng, Taufkirchen (DE); Peter Becker, Olching (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 288 days.

(21) Appl. No.: 12/674,958

(22) PCT Filed: Sep. 1, 2008

(86) PCT No.: PCT/DE2008/001434
§ 371 (c)(1),
(2), (4) Date: Feb. 24, 2010

(87) PCT Pub. No.: WO2009/046690
PCT Pub. Date: Apr. 16, 2009

(65) Prior Publication Data
US 2011/0100251 A1    May 5, 2011

(30) Foreign Application Priority Data
Oct. 10, 2007 (DE) .......................... 10 2007 051 231

(51) Int. Cl.
*B60L 13/04* (2006.01)

(52) U.S. Cl.
USPC ............................ 104/281; 104/282; 104/284

(58) Field of Classification Search ........... 104/281–286
See application file for complete search history.

(56) References Cited

U.S. PATENT DOCUMENTS

| | | | | |
|---|---|---|---|---|
| 3,750,803 | A | * | 8/1973 | Paxton .......................... 104/282 |
| 4,641,586 | A | * | 2/1987 | Miller et al. ................... 104/284 |
| 5,450,796 | A | * | 9/1995 | Sakagami ........................ 104/89 |
| 5,669,310 | A | * | 9/1997 | Powell et al. .................. 104/281 |
| 5,865,123 | A | * | 2/1999 | Powell et al. ................. 104/281 |
| 7,401,557 | B2 | * | 7/2008 | Feix et al. ..................... 104/281 |
| 7,458,323 | B2 | * | 12/2008 | Nast .............................. 104/282 |
| 7,637,214 | B2 | * | 12/2009 | Beck et al. ..................... 104/284 |
| 7,737,686 | B2 | * | 6/2010 | Schmid et al. ........... 324/207.26 |
| 7,757,609 | B2 | * | 7/2010 | Fiske et al. ............... 104/130.02 |
| 8,171,858 | B2 | * | 5/2012 | Wamble et al. ................ 104/281 |
| 8,171,859 | B2 | * | 5/2012 | Loser et al. .................... 104/281 |
| 2006/0097116 | A1 | * | 5/2006 | Fischperer ..................... 246/468 |
| 2006/0130699 | A1 | * | 6/2006 | Thornton et al. ............. 104/284 |
| 2007/0095245 | A1 | * | 5/2007 | Li ................................. 104/284 |
| 2007/0169662 | A1 | * | 7/2007 | Ellmann et al. ............... 104/282 |
| 2008/0148990 | A1 | * | 6/2008 | Wamble et al. ................ 104/281 |
| 2008/0257198 | A1 | * | 10/2008 | Beck et al. ..................... 104/284 |
| 2009/0205531 | A1 | * | 8/2009 | Miller et al. ................... 104/281 |
| 2010/0126373 | A1 | * | 5/2010 | Schmid ......................... 104/282 |
| 2011/0100251 | A1 | * | 5/2011 | Zheng et al. .................. 104/284 |

FOREIGN PATENT DOCUMENTS
DE  30 04 704   8/1981
DE  33 38 028   5/1985
(Continued)

*Primary Examiner* — Jason C Smith
(74) *Attorney, Agent, or Firm* — Michael J. Striker

(57) ABSTRACT

The invention relates to a magnetic levitation vehicle (11) and to a method for lifting said magnetic levitation vehicle (11) and to lowering said magnetic levitation vehicle onto a roadway. According to the invention, the carrier magnetic units (38) of the magnetic levitation vehicle (11) are not all activated or deactivated at the same time but at different times in order to keep the current energy requirement from an external energy supply or main power supply to a minimum.

12 Claims, 5 Drawing Sheets

FOREIGN PATENT DOCUMENTS

| | | |
|---|---|---|
| DE | 10 2004 012 746 | 10/2005 |
| DE | 10 2004 013 690 | 10/2005 |
| DE | 10 2004 013 692 | 10/2005 |
| DE | 10 2004 018 308 | 10/2005 |

* cited by examiner

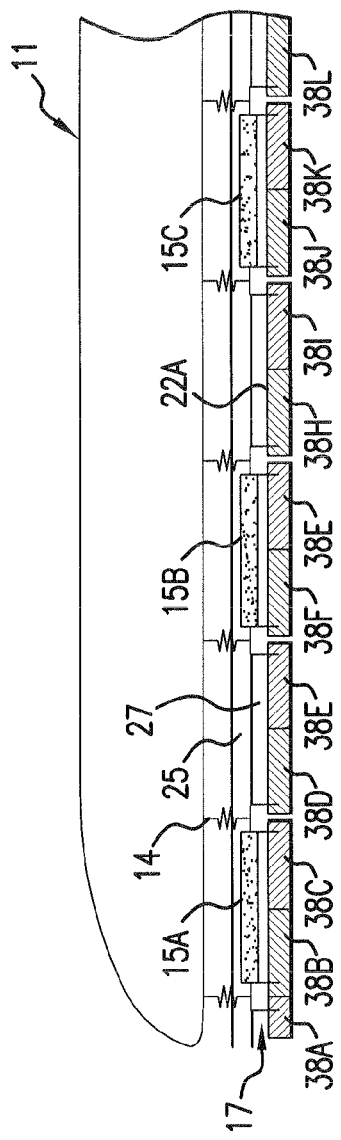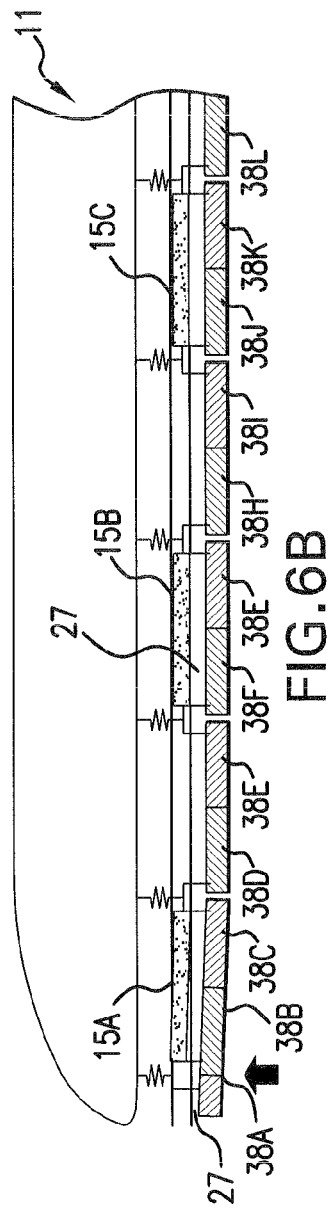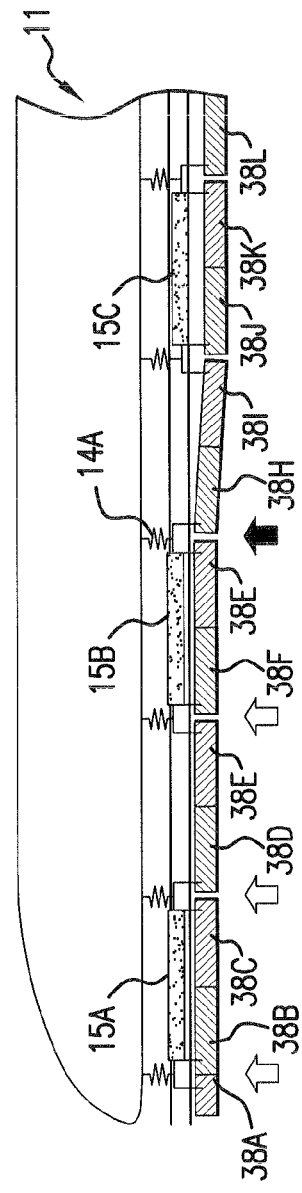

MAGNETIC LEVITATION VEHICLE AND METHOD FOR LIFTING AND/OR LOWERING THE VEHICLE

The present invention relates to a method for lifting a magnetic levitation vehicle off of a driveway, and/or for lowering a magnetic levitation vehicle onto a driveway, according to the preamble of claim 1, and to a magnetic levitation vehicle suitable therefor, according to the preamble of claim 7.

Known magnetic levitation vehicles include a large number of support magnet units arranged in succession in the longitudinal direction (e.g., DE 10 2004 012 746 A1). According to a practical embodiment, the magnetic levitation train, as viewed in its longitudinal direction, includes nine successively arranged support magnets on each side, and seven support magnets in the middle are each composed of two successively arranged support magnet units that are fixedly connected to one another, while one support magnet, which is composed of only one support magnet unit, is located on the front end and one on the back end of the magnetic levitation vehicle. In all, the vehicle therefore includes over sixteen support magnet units of this type. To create a state of levitation which is required for vehicle operation, in which the pole faces of the support magnets are located at a distance of, e.g., 10 mm from the driveway or include an elongated stator attached thereto, all of the support magnet units are activated simultaneously in order to gradually lift the vehicle off of the driveway. As a result, the vehicle is not lowered abruptly, e.g., once it has come to a standstill at the train station, but rather is lowered and set down onto the driveway gradually, in order to prevent noticeable bumps from occurring. As a result, the distance between the pole faces and the driveway is increased considerably, e.g. to a distance of 40 mm.

Since the force of an electromagnet decreases as the air gap increases, provided the current intensity remains the same, considerably greater currents are required to excite the electromagnets located in the support magnet units during a lifting or lowering procedure than are required for normal vehicle operation. One consequence of this is that the internal vehicle electrical systems, which are supplied, e.g., via batteries and/or external power supply devices (e.g., DE 10 2004 018 308 A1), must be designed with dimensions that are greater than those required for normal operation, merely to support their use during the relatively short periods of time required for the lifting and lower procedures. This is usually associated with increased vehicle weight and/or higher costs and/or additional charging cycles for the on-board batteries, all of which are undesired.

Proceeding from this, the technical problem of the present invention is to design the method and magnetic levitation vehicles described initially in such a manner that the lifting and lowering procedures may be carried out using considerably less current, without the driving comfort becoming noticeably reduced as a result.

The features of claims 1 and 7 are used to solve this problem.

The present invention is based on the finding that, mechanically speaking, activating and/or deactivating the individual support magnet units in succession does not create any problems, and is easily accommodated by the vehicle geometry. Electrically speaking, the advantage results that the amount of power required is reduced considerably. If, e.g., for the aforementioned case in which the magnetic levitation train includes over sixteen support magnet units on both sides, and eight steps are carried out in succession, during which only four support magnet units are activated or deactivated in each step, then the power required for each step is only one-eighth of the power required to activate all support magnet units simultaneously.

Further advantageous features of the present invention result from the dependent claims.

The present invention is explained below in greater detail with reference to the attached drawings of an exemplary embodiment.

FIGS. 6A through 6C are schematic depictions of the lifting—according to the present invention—of a magnetic levitation train off of a driveway in a plurality of steps that are carried out at different times.

Figure 1:
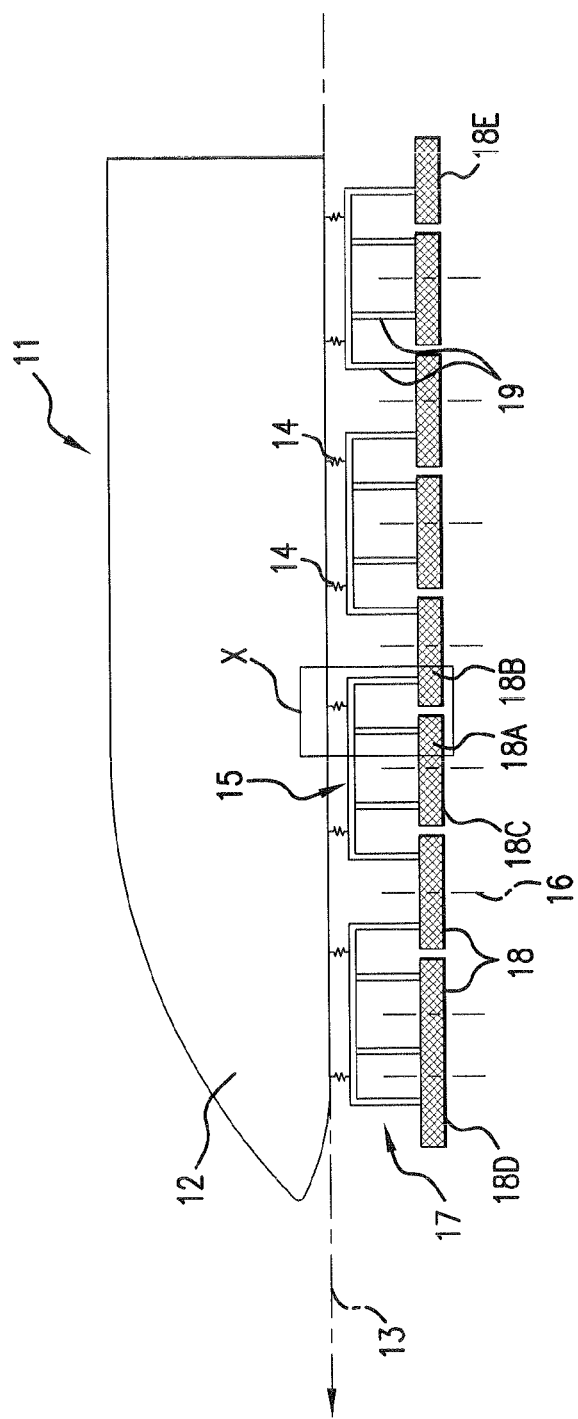
FIG. 1 shows a schematic view of the left-hand side of a typical magnetic levitation vehicle.

As shown in FIG. 1, a magnetic levitation vehicle 11 includes a coach body 12, on the underside of which a plurality of air springs 14 interspaced in a longitudinal direction 13 of magnetic levitation train 11 is mounted; longitudinal direction 13 is also the direction of travel. One air spring 14 acts on the front end and one acts on the rear end of assigned levitation chassises 15 which support coach body 12 and between which pivot points 16 are provided; pivot points 16 are depicted as intermediate spaces and allow levitation chassis 15 to perform longitudinal and transverse motions as required.

Figure 2:
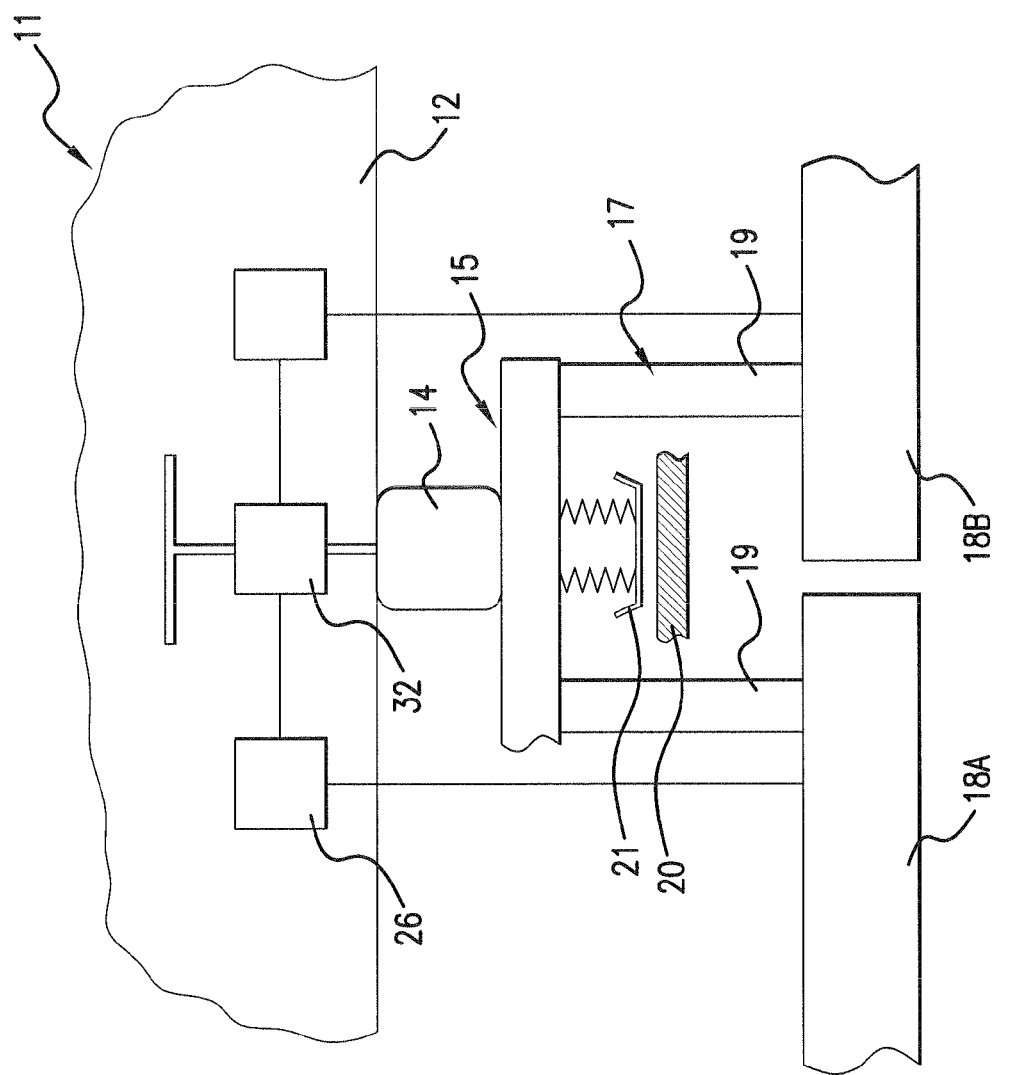
FIG. 2 shows an enlarged detail X of the magnetic levitation vehicle in FIG. 1, including additional details.

An their ends, levitation chassises 15 include levitation chassis frames 17 which are supported on support magnet units 18. In the embodiment, each levitation chassis frame 17 includes two support points 19 (see also FIG. 2) which are arranged in succession in longitudinal direction 13, and which are fastened to associated support magnet units 18. In particular, the arrangement is designed such that, on every levitation chassis frame 17 of a levitation chassis 15, two support magnet units 18 arranged in succession in longitudinal direction 13 abut one another, as indicated in FIG. 2 via 18A and 18B. In addition, in each case, two support magnet units (e.g., 18A and 18C) are rigidly connected to one another along parting lines shown in FIG. 1 as dashed lines, while the support magnet units (e.g., 18A and 18B in FIG. 1) located on either side of pivot points 16 are hingedly fastened to associated support points 19. In a central region of magnetic levitation vehicle 11, two rigidly interconnected support magnet units 18, which are also referred to as magnet halves, thereby form one support magnet.

Magnetic levitation vehicle 11 shown in FIG. 1 is, e.g., the section of a train furthest to the front. In this case, therefore, a front support magnet, which includes only one support magnet unit 18D, is rigidly connected to the next support magnet, while, at the read end, a support magnet, which is likewise formed by only one support magnet unit 18E, is rigidly connected to a corresponding support magnet which is mounted to a subsequent magnetic levitation vehicle, which is not shown in FIG. 1, and which forms a middle section or even a rear section of a train.

Furthermore, FIG. 2 shows a schematic depiction of a slide rail 20 which is mounted on a not-shown driveway for magnetic levitation vehicle 11, and onto which magnetic levitation vehicle 11 is set down using undercarriage skids 21, which are fastened to levitation chassises 15, when support magnet units 18 are de-energized and are therefore unable to be used for support.

Figure 3:
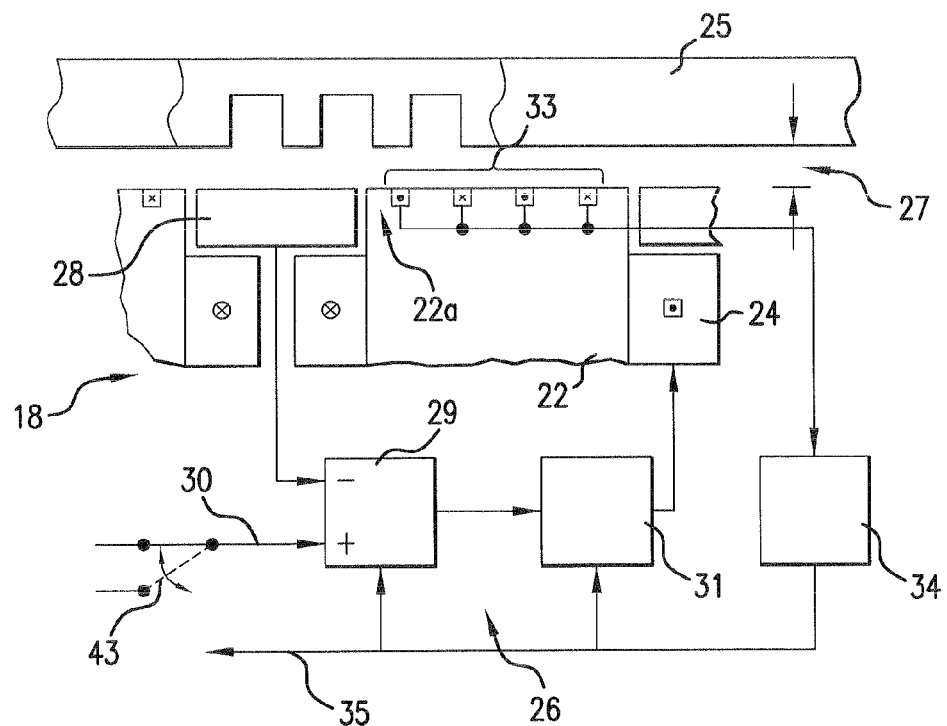
FIG. 3 shows a schematic view of a control loop for support magnet units of the magnetic levitation vehicle in FIGS. 1 and 2.

As shown in FIG. 3, support magnet units 18 include a plurality of electromagnets having magnetic poles which are composed mainly of cores 22 and windings 24 placed around it; electric currents that are required to create the desired state of levitation are supplied to windings 24. At the same time, support magnet units 18 are used, e.g., as excitation magnets of an elongated stator-linear motor which is used to propel magnetic levitation vehicle 11, and which includes a reaction rail 25 (FIG. 3) which is situated opposite support magnet units 18 and is fastened to the driveway, reaction rail 25 including typical three-phase alternating current windings.

The currents that flow through windings 24 of support magnet units 18 are typically regulated using control loops 26 (FIG. 3) in such a manner that, in the state of levitation which is intended for normal vehicle operation, a support gap 27 of, e.g., 10 mm, is formed between magnet pole faces 22*a* and reaction rail 25. To maintain support gap 27, control loops 26 include gap sensors 28 that advantageously bound the same plane as magnet pole face 22*a* and measure the actual size, i.e., the actual value of support gap 27, using inductive or capacitive means. The electrical signals emitted by gap sensors 28 are supplied to a controller 29, where it is compared to a setpoint value that is fixedly specified or adapted via a line 30. Based thereon, controller 29 determines a differential or actuating signal for an actuator 31, which controls the current through windings 24 in a manner such that gap 27 maintains a substantially constant size and is retained during travel.

Once the magnetic levitation vehicle has been brought to a stop in a train station or the like, if it should now be set down onto slide rails 20 using undercarriage skids 21 (FIG. 2), it is only necessary for a related setpoint value (e.g., corresponding to a gap size=infinite) to be specified to controller 29 via line 30. As a result, the currents flowing through windings 24 are reduced or set to zero, with the result that support magnet units 18 lose their support force, and magnetic levitation vehicle 11 is set down onto the driveway.

Air springs 14 are connected to a source of compressed air, which is not depicted here, and are connected to a control unit 32, as shown in FIG. 2. This makes it possible to connect air springs 14 either to the source of compressed air or to a ventilation line, which is likewise not depicted.

Control loops 26 and their control units 32 are supplied with power, e.g., via linear generators 33 (FIG. 3) which are accommodated in cores 22, and via voltage transformers 34 which are connected to linear generators 33, and which are likewise connected via lines 35 to the particular vehicle electrical systems of magnetic levitation vehicle 11, and which may be used, e.g., to charge on-board batteries. As an alternative, other devices may be used that utilize, e.g., contactless, inductive energy transmission from the driveway to magnetic levitation vehicle 11.

Magnetic levitation vehicles of the type described herein, and methods for their operation, are known to a person skilled, e.g., from DE 30 04 704 C2, DE 10 2004 012 746 A1) and DE 10 2004 013 690 A1 which are hereby made the subject matter of the present disclosure via reference, in order to avoid repetition.

Figure 5:
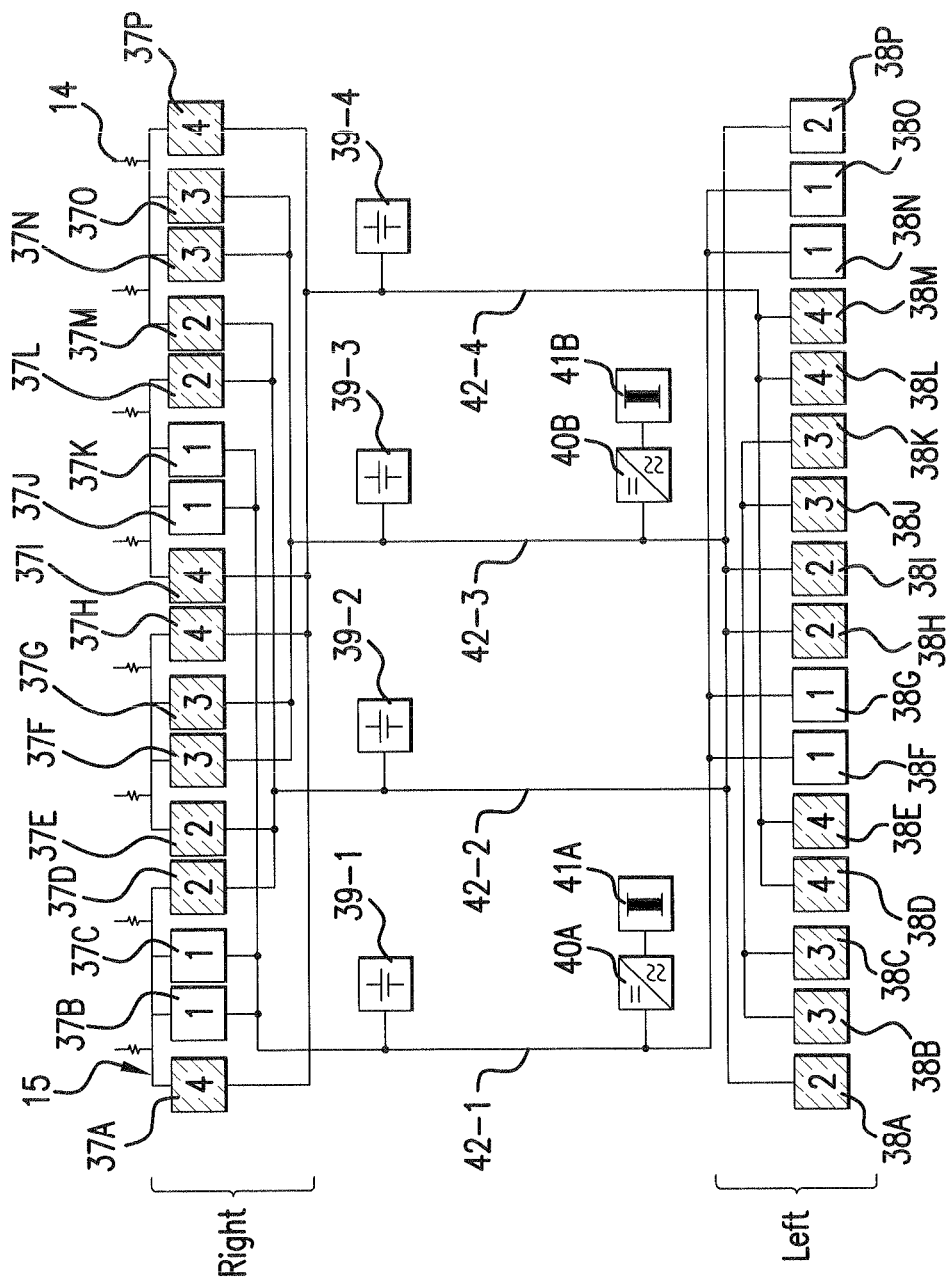
FIG. 5 shows an embodiment of a control device according to the present invention.

Previously it was necessary to activate or deactivate all support magnet units 18 simultaneously in order to perform the lifting or lowering procedure for magnetic levitation vehicle 11 by supplying related currents or by switching off these currents. According to the present invention, it is therefore provided that support magnet units 18 are activated or deactivated at different times and, therefore, in succession. A control device which is depicted schematically in FIG. 5 is used for this purpose; it will be explained in greater detail below with reference to a special embodiment. As shown in FIG. 1, it is assumed that magnetic levitation vehicle 11, as viewed in longitudinal direction 13, includes nine support magnets on the right side of the vehicle and nine support magnets on the left side of the vehicle. As indicated in FIG. 1, the seven support magnets located in the middle part of the vehicle are each formed of two successively arranged support magnet units 18. In addition, a single support magnet unit is provided on the front end or nose (to the far left in FIG. 1) and one at the rear end (to the far right in FIG. 1) of vehicle 11, each single support magnet unit forming an eighth and ninth support magnet, respectively. In FIG. 5, these support magnet units are labeled, from front to back, with reference numerals 37A through 37P for the right side of the vehicle, and with reference numerals 38A through 38P for the left side of the vehicle. Furthermore, as shown in FIG. 5, four vehicle electrical systems 39-1 through 39-4 are provided, which are mainly formed, e.g., by 440 V direct-voltage batteries. Finally, a DC/AC converter 40A, 40B is connected to each of the vehicle electrical systems 39-1 and 39-3, which converts the 440 V direct voltage into a 230V alternating voltage, via which pneumatic assemblies 41A, 41B—which also include, e.g., control units 32 (FIG. 2) for air springs 14—are operated.

Vehicle electrical system 39-1 is connected via a schematically depicted line 42-1 to support magnet units 37B, 37C, 37J and 37K on the right side of the vehicle, and to support magnet units 38F, 38G, 38N and 38O on the left side of the vehicle. Vehicle electrical system 39-2 is connected via a line 42-2 to support magnet units 37D, 37E, 37L and 37M on the right side of the vehicle, and to support magnet units 38A, 38H, 38I and 38P on the left side of the vehicle. Vehicle electrical system 39-3 is connected via a line 42-3 to support magnet units 37F, 37G, 37N and 37O on the right side of the vehicle, and to support magnet units 38B, 38C, 38J and 38K on the left side of the vehicle. Finally, vehicle electrical system 39-4 is connected via a line 42-4 to support magnet units 37A, 37H, 37I and 37P on the right side of the vehicle, and to support magnet units 38D, 38E, 38L and 38M on the left side of the vehicle. This means that the electromagnets of support magnet units 37 and 38 are each supplied with current via lines 42-1 through 42-4 by only one assigned vehicle electrical system of the four vehicle electrical systems 39-1 through 39-4, and the level of these currents depends mainly on which setpoint values are specified to associated controllers 26. For clarity, all support magnet units 37, 38 in FIG. 5 are also labeled with numerals 1 through 4 in order to indicate to which of the four lines 42-1 through 42-4 they are connected, and to which of the four vehicle electrical systems 39-1 through 39-4 they are connected.

The magnetic levitation vehicle described above is operated substantially as follows:

The lifting of magnetic levitation vehicle 11 from the driveway and into the state of levitation will be described first. As shown in FIG. 6A, which shows a side view of the left side of the vehicle, magnetic levitation vehicle 11 is still situated in a lowered position, in which it rests on slide rails 20, e.g., via undercarriage skids 21 (FIG. 2). In this state, pole faces 22*a* (FIG. 3) of support magnet units 38 are situated at a relatively large distance away from reaction rail 25, and so magnetic gap 27 has a size of, e.g., 40 mm.

Starting at the front end of magnetic levitation vehicle 11, the first two, rigidly interconnected support magnet units 37*a*, 37*b*, 38*a*, 38*b* on the right and left sides of the vehicle (FIGS.

5 and 6) are activated by specifying, e.g., setpoint values via lines 30 to controllers 29 (FIG. 3), the setpoint values corresponding to a support gap 27 of 10 mm. As a result, corresponding currents are supplied to windings 24 of support magnet units 37A, 37B, 38A and 38B, and front end of levitation chassis 15A located at the front is lifted. This is indicated in FIG. 6B, which shows levitation chassis 15A slanted at a slight angle since its front side and support magnet units 34A and 38B were lifted, forming a support gap 27 of, e.g., 10 mm, while support magnet unit 38C which is coupled to its rear end, has not yet been supplied with current (i.e., activated), and therefore still forms a support gap of 40 mm.

After pole faces 22a of support magnet units 38A, 38B and, therefore, support magnet units 37A, 37B on the right side of the vehicle have been set to a gap distance of 10 mm, a second group of support magnet units is activated in a second step, this group containing support magnet units 38C 38D (and, correspondingly, 37C, 37D). As a result, levitation chassis 15A is also lifted at its rear end to a gap distance of 10 mm.

Support magnet unit 38D is also lifted. Together with support magnet unit 38E rigidly connected to it, support magnet unit 38D forms a support magnet that is situated between levitation chassis 15A and a levitation chassis 15B that follows in longitudinal direction 13 and is therefore postioned somewhat at a slant, as shown as an example in FIG. 6B only for the support magnet formed by support magnet units 38B and 38C.

In a further step, support magnet units 38E, 38F (and 37E, 37F) are activated, thereby likewise lifting the rear ends of the support magnets they form, while the front ends of levitation chassis 15B are lifted, as shown in FIG. 6B for levitation chassis 15A. These procedures are then repeated in steps until pole faces 22a of all support magnet units 37, 38 have reached the setpoint dimension of support gap 27 of 10 mm, and are each held in this position using control loops 26 shown in FIG. 3.

FIG. 6C shows a position in which the fourth method step has just been carried out and, therefore, support magnet units 38G, 38H have already been activated. It is understood that the same procedures are carried out on the right side of the vehicle, which is not visible in FIG. 6, i.e., support magnet units 37G, 37H are also activated in the state shown in FIG. 6C.

Once all support magnet units 37, 38 have been supplied with current in succession, magnetic levitation vehicle 11 is situated in the typical state of levitation which is required for normal vehicle operation. This state is maintained by control loops 26 for as long as the vehicle is traveling.

Once magnetic levitation vehicle 11 has been brought to a standstill, e.g., in a train station, if it should now be set down onto slide rails 20 using undercarriage skids 21, the above-described procedure is carried out once more, although in the reverse direction, e.g., by specifying setpoint values to controllers 29 via lines 30 that correspond to a support gap 27 of 40 mm or, advantageously, to an infinitely large support gap 27. In this case as well, support magnet units 37, 38 are activated at different times, in groups and in succession, by starting the lowering procedure, e.g., with first group 37A, 37B, 38A, 38B, and ending it with eighth group 37O, 37P, 38O, 38P.

Figure 4:
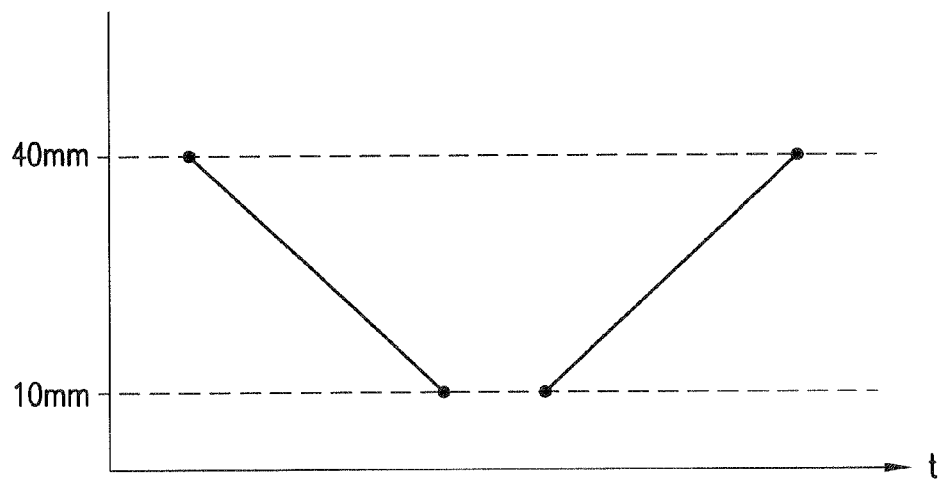
FIG. 4 shows the graph of setpoint values over time for the control loop in FIG. 3.

To prevent abrupt transitions from one state to the next, the setpoint values are specified, as shown in FIG. 4, not in a stepped manner, but rather along a gradually decreasing or increasing ramp in accordance with gradually decreasing or increasing currents. Still, the lifting or lowering procedure carried out per group of support magnet units may be executed very quickly, e.g., at a maximum of one second each, and so the lifting and lower procedure for entire magnetic levitation vehicle 11 takes only a few seconds, which is barely perceptible to the passengers. Apart from this, a simple switching unit may be provided, as indicated in FIG. 3 via reference numeral 43, to switch from one setpoint value to another setpoint value.

As shown in FIG. 5, the groupwise activation/deactivation of support magnet units 37, 38 is preferably carried out in a manner such that, in each method step, each of the four available vehicle electrical systems 39-1 through 39-4 always supplies only a single support magnet unit 37, 38 with current. In the first step, e.g., vehicle electrical system 39-1 supplies support magnet unit 37B via line 42-1, vehicle electrical system 39-2 supplies support magnet unit 38A via line 42-2, vehicle electrical system 39-3 supplies support magnet unit 38B via 42-3, and vehicle electrical system 39-4 supplies support magnet unit 37A via line 42-4. Accordingly, in the eighth and final step, vehicle electrical system 39-1 would supply support magnet unit 38O with current, vehicle electrical system 39-2 would supply support magnet unit 38P with current, vehicle electrical system 39-3 would supply support magnet unit 37O with current, and vehicle electrical system 39-4 would supply support magnet unit 37P with current. This results in the considerable advantage that all vehicle electrical systems 39 are always loaded equally, and are only responsible for supplying one support magnet unit 37 or 38 that is involved in the lifting or lowering procedure. It is therefore possible to design vehicle electrical systems 39, and their batteries in particular, to be much weaker since every vehicle electrical system previously had to supply eight support magnet units with current simultaneously for this procedure.

Furthermore, vehicle electrical systems 39 are connected in a manner such that they supply support magnet units located on the right and left sides of the vehicle. This results in the advantage that, if one of the vehicle electrical systems 39 should fail, one side of the vehicle will not become completely disabled. As shown in FIG. 5 in particular, if, e.g., vehicle electrical system 39-3 should fail, only support magnet units 37N, 37G, 37N and 37O on one side, and support magnet units 38B, 38C, 38J and 38K on the other side become unable for the lifting/lowering procedure, while all of the remaining support magnet units continue to be fully operational. Furthermore, it is advantageous that the disabled support magnet units are not situated directly opposite one another on the right and left, but rather are offset relative to one another in longitudinal direction 13.

A further substantial advantage of the present invention may be attained by depressurizing air springs 14 during the lifting and lower procedures, using control devices 32 (FIG. 2) and DC/AC converters 40A, 40B (FIG. 5) for pneumatic assemblies 41A, 41B. If, e.g., one air spring 14A in FIG. 6C is depressurized when associated support magnet units 38G, 38H (and, correspondingly, support magnet units 37G, 37H on the right side of the vehicle) are activated or deactivated, then the latter are largely relieved of the weight of the related levitation chassis (15B in this case) in the moment when the lifting or lowering procedure takes place. The currents required to activate them are therefore much weaker than would be the case if the lifting and lowering procedure were carried out under full load. When the lifting and lowering procedure has ended, air springs 14 are re-pressurized. The means required for this may be analogous to those used in known air-spring controls (e.g., DE 20 2004 013 690A1).

The present invention is not limited to the embodiments described, which could be modified in various manners. This applies foremost for the number of steps carried out during the lifting or lowering of magnetic levitation vehicle 1 at different times. For example, it would be possible to perform only four steps, and to supply two support magnet units 37 or 38 using one vehicle electrical system 39 in each case. Furthermore, the number of steps to be carried out depends largely on the design of particular magnetic levitation vehicle 1, and, in particular, on the number of levitation chassises 15 and levitation chassis frames 17 or similar devices that are present. Furthermore, it is clear that the activation/deactivation of the support magnet units may take place in a sequence that is different from that described, and e.g., in the reverse direction from back to front. Accordingly, more or fewer than sixteen support magnet units may be provided on each side for each magnetic levitation vehicle; solutions are also feasible in which the support magnet units are only located in a middle part of the magnetic levitation vehicle. In addition, the use of four vehicle electrical systems for one magnetic levitation vehicle 11 should be regarded merely as an example. Furthermore, it is possible to connect lines 42-1 through 42-4 (FIG. 5) with additional current sources or current sources other than those shown, in particular, e.g., to typical linear generators 33 (FIG. 3), conductor rails, inductive energy transmitters, etc. Furthermore, to protect the vehicle electrical system, it is advantageous to also switch off any guidance magnet systems that may be present during the lifting/lower procedures because they are not needed during these phases and would perhaps increase the amount of power required. Finally, it is understood that the various features may also be used in combinations other than those described and depicted herein.

What is claimed is:

1. A method of lifting and lowering relative to a track a magnetic-levitation vehicle having a plurality of groups of support magnet units arrayed in a longitudinal row, the method comprising the steps of:
   raising the vehicle by electrically energizing the groups of magnet units one after the other, with each group being energized only after the preceding group has been raised by a predetermined vertical gap above the track; and
   lowering the vehicle by electrically deenergizing the groups of magnet units one after the other, with each group being deenergized only after the preceding group has been lowered to form a predetermined vertical gap above the track.

2. The method as recited in claim 1, wherein the support magnet units, as viewed longitudinally, are energized and deenergized in succession in longitudinal order.

3. The method as recited in claim 1, wherein the magnetic levitation vehicle has a plurality of longitudinally succeeding levitation chassis frames each coupled to at least a respective one of the support magnet units and to a coach body of the vehicle via air springs, the support magnet units being energized and deenergized in such a manner that the levitation chassis frames are lifted and lowered in longitudinal succession.

4. The method as recited in claim 3, wherein, as each levitation chassis frame is lifted or lowered, the respective air spring is at least partially depressurized.

5. The method as recited in claim 3, wherein each levitation chassis frame that is coupled to two respective longitudinally succeeding support magnet units that are simultaneously energize and deenergized when the magnetic levitation vehicle is lifted and for lowered.

6. The method as recited in claim 1, wherein, the magnetic levitation vehicle also includes guidance magnet systems that may be activated using electric currents, the guidance magnet systems being deactivated when the magnetic levitation vehicle is lifted or lowered.

7. A magnetic-levitation vehicle comprising:
   a plurality of groups of support magnet units arrayed in a longitudinal row; and
   control means for
      raising the vehicle by electrically energizing the groups of magnet units one after the other, with each group being energized only after the preceding group has been raised by a predetermined vertical gap above the track, and
      lowering the vehicle by electrically deenergizing the groups of magnet units one after the other, with each group being deenergized only after the preceding group has been lowered to form a predetermined vertical gap above the track.

8. The magnetic levitation vehicle as recited in claim 7, wherein the control energizes and deenergizes the support magnetic units in succession in longitudinal order.

9. The magnetic levitation vehicle as recited in claim 7, further comprising:
   a coach body and
   a plurality of longitudinally succeeding levitation chassis frames each coupled to at least a respective one of the support magnet units and to the coach body via at least one respective controllable air spring, the control means lifting and lowering the levitation chassis frames in succession in longitudinal order.

10. The magnetic levitation vehicle as recited in claim 9, wherein the control means includes means for depressurizing the air springs when the levitation chassis frames assigned to them are lifted and lowered.

11. The magnetic levitation vehicle as recited in claim 9, wherein each levitation chassis frame is coupled to two respective longitudinally succeeding support magnet units, the control means, when levitation chassis frame (17) is lifted and lowered, energizing and deenergizing the respective support magnet units.

12. The magnetic levitation train as recited in claim 7, further comprising:
   a guidance magnet system having electrically powered electromagnets, and means for deactivating the guidance magnet system during a lifting and lowering procedure.

* * * * *